United States Patent
Tung et al.

(10) Patent No.: US 9,025,787 B2
(45) Date of Patent: May 5, 2015

(54) EARPHONE PLUG WITH MODE SWITCHING FUNCTION

(75) Inventors: Chiu-Yun Tung, Taichung (TW); Fang-Chang Hsieh, Taichung (TW); Yuan-Hsing Wu, Taichung (TW); Chiung-Wen Yeh, Taichung (TW)

(73) Assignee: Merry Electronics Co., Ltd., Taichung (TW)

( * ) Notice: Subject to any disclaimer, the term of this patent is extended or adjusted under 35 U.S.C. 154(b) by 1204 days.

(21) Appl. No.: 12/949,174

(22) Filed: Nov. 18, 2010

(65) Prior Publication Data
US 2012/0128169 A1    May 24, 2012

(51) Int. Cl.
*H04R 1/10*    (2006.01)
*H01R 24/58*    (2011.01)
*H01R 13/70*    (2006.01)
*H04M 1/725*    (2006.01)
*H01R 107/00*    (2006.01)

(52) U.S. Cl.
CPC .............. *H04R 1/1041* (2013.01); *H01R 24/58* (2013.01); *H01R 13/701* (2013.01); *H04M 1/72527* (2013.01); *H01R 2107/00* (2013.01)

(58) Field of Classification Search
CPC .. H01R 13/701; H01R 24/58; H01R 2107/00; H01R 1/1041; H01R 5/033; H04M 1/72527
USPC ............ 381/74, 384, 370, 123; 439/668, 669; 307/102, 112
See application file for complete search history.

(56) References Cited

U.S. PATENT DOCUMENTS

| 7,618,294 B1 * | 11/2009 | Lin et al. ........................ 439/669 |
| 8,362,654 B2 * | 1/2013 | Inha et al. ...................... 307/112 |
| 2008/0181423 A1 * | 7/2008 | Duarte et al. ................... 381/74 |

* cited by examiner

*Primary Examiner* — Vivian Chin
*Assistant Examiner* — Con P Tran
(74) *Attorney, Agent, or Firm* — Muncy, Geissler, Olds & Lowe, P.C.

(57) ABSTRACT

An earphone plug with a mode switching function is presented. The earphone plug includes a terminal and a switching device. The terminal has a plurality of electrodes to transmit signals. The switching device is combined with the terminal, and is capable of switching between a first mode and a second mode, and part of the electrodes of the terminal are electrically connected together, so as to achieve mode switching to perform processing on different transmission signals.

8 Claims, 8 Drawing Sheets

EARPHONE PLUG WITH MODE SWITCHING FUNCTION

BACKGROUND OF THE INVENTION

1. Field of Invention

The present invention relates to an earphone plug, and more particularly to an earphone plug with a mode switching function, which is selectively applicable to mobile phones or music players by switching a control mode between a three-electrode mode and a four-electrode mode.

2. Related Art

Earphone is an indispensable accessory in portable electronic products for providing audio information. Earphone plugs are divided into conventional three-pole earphone plugs and conventional four-pole earphone plugs which are respectively applicable to portable electronic products with different functions. FIGS. 1 and 2 are respectively external views of a conventional three-pole earphone plug 1 and a conventional four-pole earphone plug 2.

The three-pole earphone plug 1 includes three electrodes 1a, 1b, and 1c, for respectively transmitting a left channel signal, a right channel signal, and a ground signal, so that the earphone plug 1 is applicable to a personal portable music device such as MP3 to provide stereo music information. However, the earphone plug 1 can only output sound due to the structural limit, and cannot provide sound receiving function, so that it cannot be used as a hand-free receiver for mobile phones.

The four-pole earphone plug 2 includes four electrodes 2a, 2b, 2c, and 2d, for respectively transmitting a left channel signal, a right channel signal, a microphone signal, and a ground signal, so that the earphone plug 2 can be used as a hand-free receiver for mobile phones. Accordingly, due to the structure, the earphone plug 2 with four electrodes cannot be used in conjunction with three-pole earphone jacks, so that consumers must take number of poles into consideration when choosing earphones. As conventional earphone plugs can only be fitted to corresponding earphone jacks, the use of earphones is limited, and the consumer must additionally buy different types of earphone plugs to meet requirements for different electronic products, especially when the earphone is used between products such as mobile phones and music devices, which will result in economic burden.

In order to solve the problem, an adapter has been available on the market, which is used for connection to a four-pole earphone plug, such that the earphone plug is applicable to a three-pole earphone jack, thereby eliminating the use limit of the four-pole earphone plug. However, there still exist problems that the consumers still have to spend money to purchase the adapter and the adapter may easily be lost which causes inconvenience in use.

SUMMARY OF THE INVENTION

Accordingly, the present invention is directed to an earphone plug with a mode switching function, which includes a terminal and a switching device. The terminal has a plurality of electrodes for transmitting signals. The switching device is combined with the terminal, and is capable of switching between a first mode and a second mode, and part of the electrodes of the terminal are electrically connected together, so as to achieve mode switching to perform processing on different transmission signals.

In order to achieve the above objectives, according to the present invention, the terminal has a first electrode, a second electrode, a third electrode, and a fourth electrode, and further includes a first conductive member and a second conductive member, the switching device has a movable sleeve disposed at a rear end of the terminal, and the movable sleeve has a metal sheet for being pressed against the first conductive member and second conductive member when the earphone plug is switched from the first mode to the second mode, such that the first conductive member and the second conductive member are electrically connected, the corresponding third electrode and fourth electrode are conducted, and the earphone plug is switched from a four-electrode state to a three-electrode state. Therefore, the earphone plug of the present invention is applicable to mobile phones and music players at the same time.

In order to achieve the above objectives, according the present invention, a fixed sleeve is connected to the rear end of the terminal, a plastic member is embedded between the fixed sleeve and the terminal, the plastic member has a pair of stopping blocks, and the movable sleeve correspondingly has a pair of guide grooves disposed thereon, so as to limit the rotation position of the movable sleeve relative to the plastic member.

In order to achieve the above objectives, according the present invention, the fixed sleeve has a marking point, the movable sleeve has a bushing sleeved outside, and the bushing has an indication area corresponding to the marking point to indicate a position when switching.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Hereinafter, embodiments of an earphone plug with a mode switching function in the present invention are described with reference to the accompanying drawings.

Figure 1:
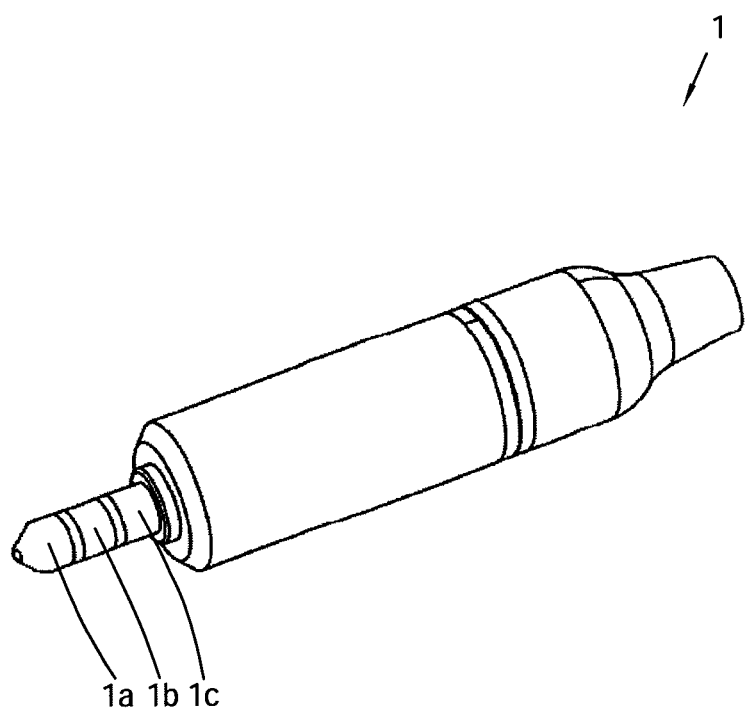
FIG. 1 is an external view of a conventional three-pole earphone plug.
Figure 2:
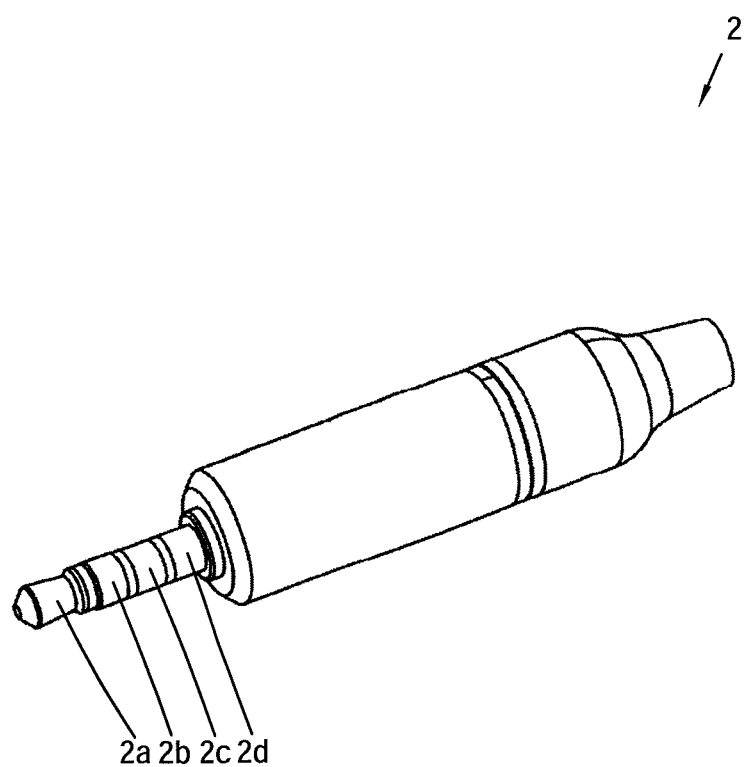
FIG. 2 is an external view of a conventional four-pole earphone plug.
Figure 3:
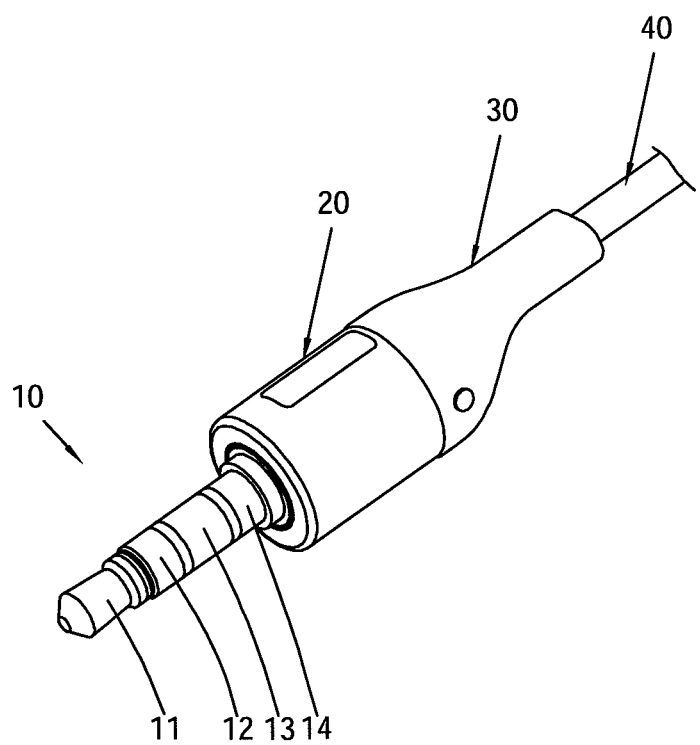
FIG. 3 is an external view of an earphone plug with a mode switching function according to the invention.

FIG. 3 is an external view of an earphone plug with a mode switching function according to the invention. Referring to FIG. 3, the earphone plug 100 includes a terminal 10, a switching device 20, a fixed sleeve 30, and a wire 40.

Figure 4:
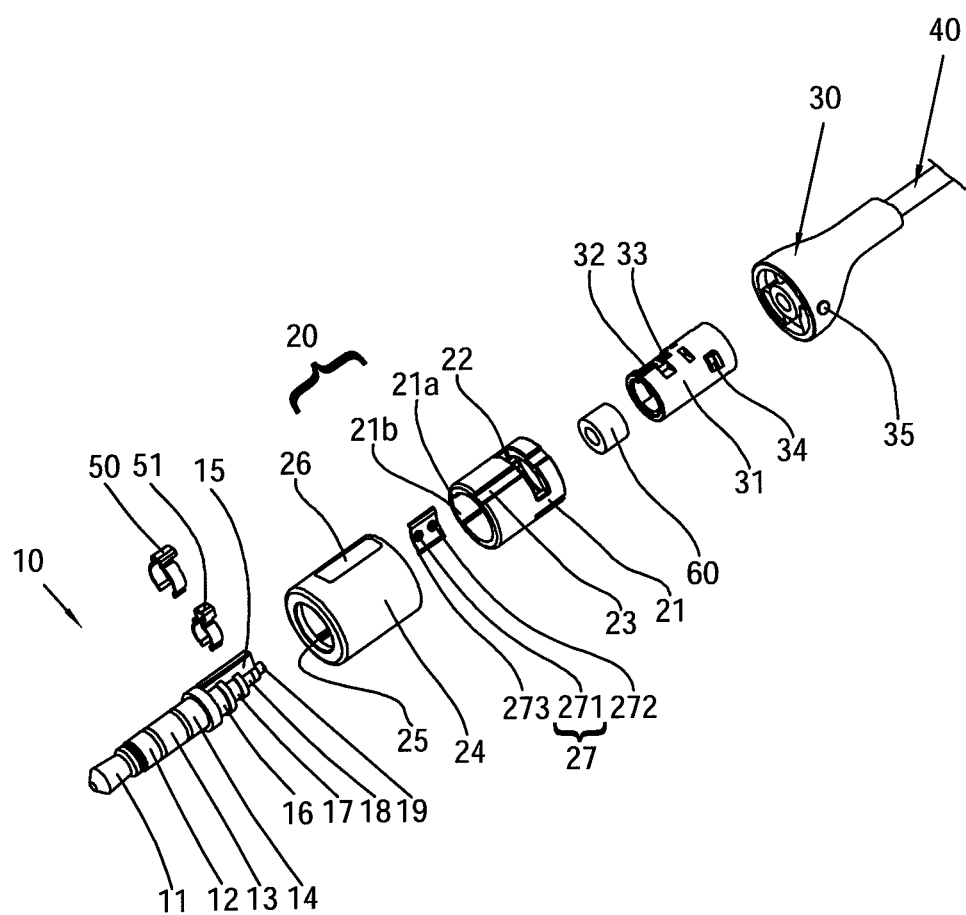
FIG. 4 is an exploded view of the earphone plug with a mode switching function according to the invention.

FIG. 4 is an exploded view of the earphone plug with a mode switching function according to the invention. Referring to FIG. 4, the terminal 10 has a first electrode 11, a second electrode 12, a third electrode 13, and a fourth electrode 14 disposed thereon in sequence from left to right, and an insulating portion 15 connected to the rear of the fourth electrode 14. The insulating portion 15 has a first terminal groove 16, a second terminal groove 17, a hollow terminal portion 18, and a tail end 19. The first terminal groove 16 and the second terminal groove 17 are clamped by a first conductive member 50 and a second conductive member 51 respectively.

The first conductive member 50, the second conductive member 51, the terminal portion 18, and the tail end 19 serve as contact portions for electrical connection, to be welded and connected to a left channel signal line, a right channel signal line, a microphone signal line, and a ground signal line (not shown) in the wire 40 respectively. The first electrode 11, the second electrode 12, the third electrode 13, and the fourth electrode 14 are electrically connected to the first conductive member 50, the second conductive member 51, the terminal portion 18, and the tail end 19 respectively. The main structural feature of the terminal 10 in the present invention is a four-pole terminal in the prior art, and thus will not be described herein again.

The switching device 20 includes a movable sleeve 21, which has a pair of hollow guide grooves 22 opened at transverse positions, and a pair of fastening grooves 23 disposed on an outer periphery at axial positions and in communication with the guide grooves 22. The movable sleeve 21 has a combination groove 21a disposed on an inner periphery, and the combination groove 21a has a positioning portion 21b recessed on two sides thereof respectively. The switching device 20 further includes a bushing 24, which has a pair of fastening blocks 25 disposed on an inner surface thereof to fit the fastening grooves 23 of the movable sleeve 21, and an indication area 26 disposed on an outer periphery thereof. In addition, the switching device 20 further includes a revised U-shaped elastic metal sheet 27 fixed into the combination groove 21a of the movable sleeve 21 in a mechanical manner or other equivalent manners, and the metal sheet 27 has a first contact 271 and a second contact 272 disposed thereon, and two foot portions 273 disposed on two sides thereof. The foot portions 273 can be combined with the positioning portion 21b.

The wire 40 extends though one end of the fixed sleeve 30, and a plastic member 31 is combined with the other end of the fixed sleeve 30. The plastic member 31 is embedded between the insulating portion 15 of the terminal 10 and the fixed sleeve 30, and has a first perforation 32, a second perforation 33, and a pair of stopping blocks 34 disposed at an end on an outer periphery. When the plastic member 31 is sleeved on the insulating portion 15 of the terminal 10, the first perforation 32 and the second perforation 33 fit the first conductive member 50 and the second conductive member 51, so that the first conductive member 50 and the second conductive member 51 partially protrude from the outer periphery of the plastic member 31. The fixed sleeve 30 is provided to assemble the movable sleeve 21, and the stopping blocks 34 of the fixed sleeve 30 are placed in the guide grooves 22 of the movable sleeve 21, so as to limit the displacement when the movable sleeve 21 rotates relative to the fixed sleeve 30 in a transverse direction. When the movable sleeve 21 rotates relative to the fixed sleeve 30, the metal sheet 27 of the movable sleeve 21 selectively contacts the first conductive member 50 and the second conductive member 51. Through the fitting of the fastening blocks 25 of the bushing 24 and the fastening grooves 23 of the movable sleeve 21, the user can directly control the bushing 24 to drive the movable sleeve 21 to perform switching action. Furthermore, a marking point 35 is disposed on an outer surface of the fixed sleeve 30, for alignment with the indication area 26 of the bushing 24 to indicate the state position. For example, in the invention, if the marking point 35 and the indication area 26 are separated, a first mode is indicated, and if they are aligned, a second mode is indicated.

It should be noted that, a magnetic ring 60 is disposed inside the plastic member 31, for eliminating noise of the earphone plug 100.

Figure 5:
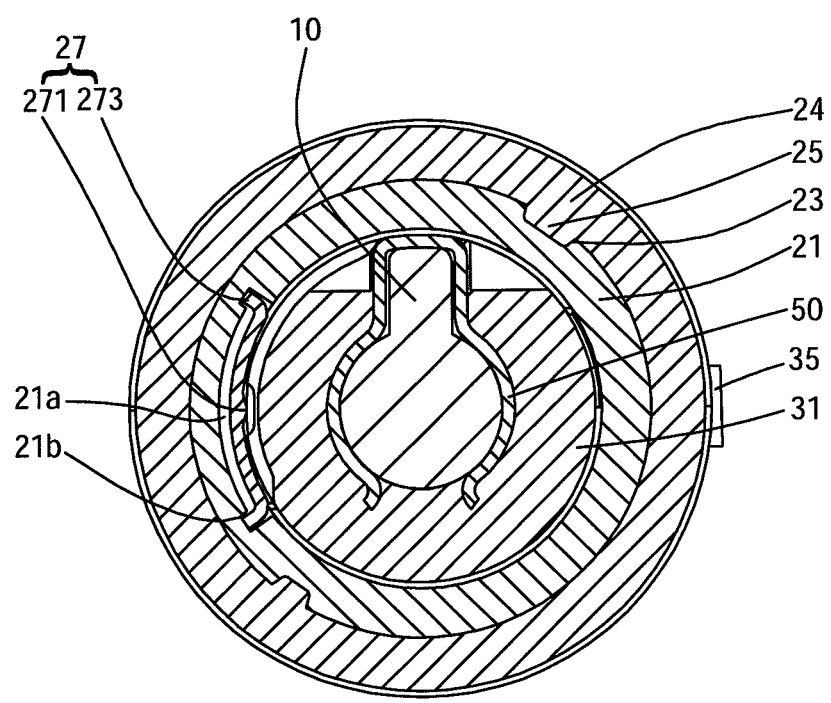
FIG. 5 is a transverse sectional view (I) of the earphone plug with a mode switching function according to the invention.

FIG. 5 is a transverse sectional view (I) of the earphone plug with a mode switching function according to the invention. Referring to FIG. 5, the earphone plug 100 is in the first mode, and the metal sheet 27 of the movable sleeve 21 is away from the first conductive member 50 of the terminal 10 without contact there-between.

Figure 6:
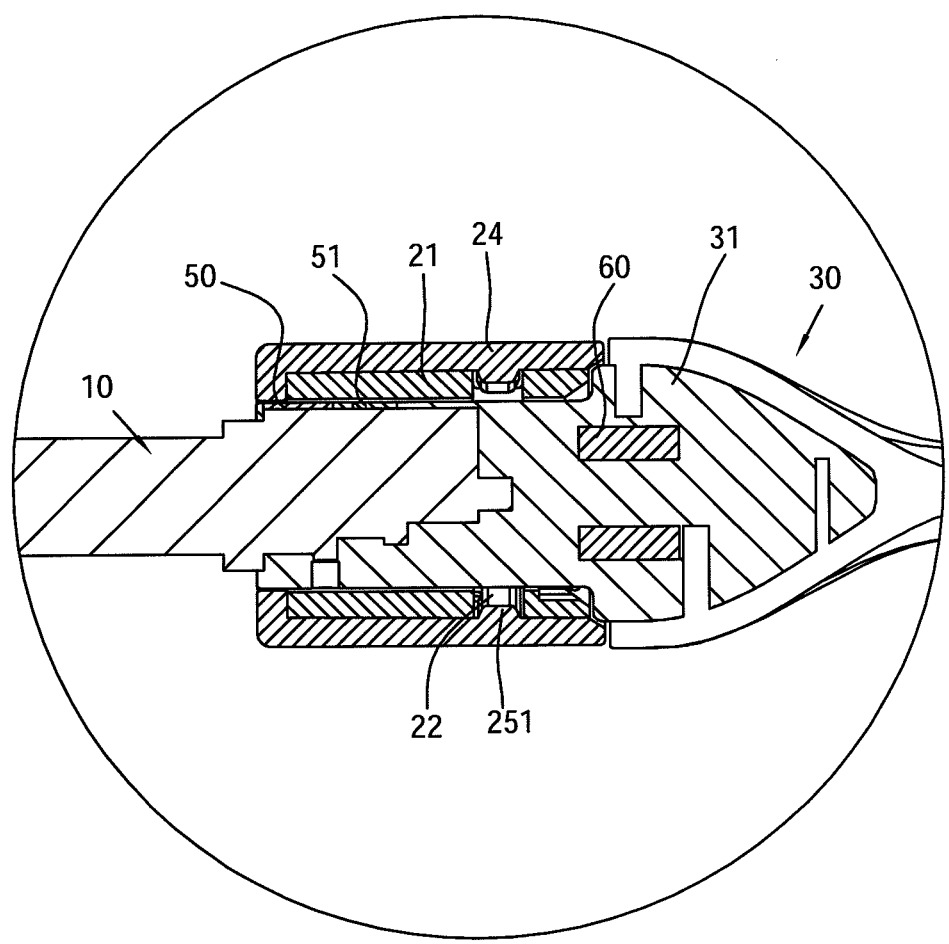
FIG. 6 is a partial axial sectional view (I) of the earphone plug with a mode switching function according to the invention.

FIG. 6 is an axial sectional view (I) of the earphone plug with a mode switching function according to the invention. Referring to FIG. 6, as the first conductive member 50 and the second conductive member 51 are respectively in an independent state when the earphone plug 100 of the invention is in the first mode, the terminal 10 is in communication with the left channel signal line, the right channel signal line, the microphone signal line, and the ground signal line of the wire 40, and the earphone plug 100 is correspondingly applicable to four-electrode earphone jacks, especially mobile phones with a voice call function. It should be mentioned that, in the invention, an annular bump 251 is disposed transversally on an inner periphery of the bushing 24, and is positioned in the guide grooves 22 of the movable sleeve 21 for secure positioning.

Figure 7:
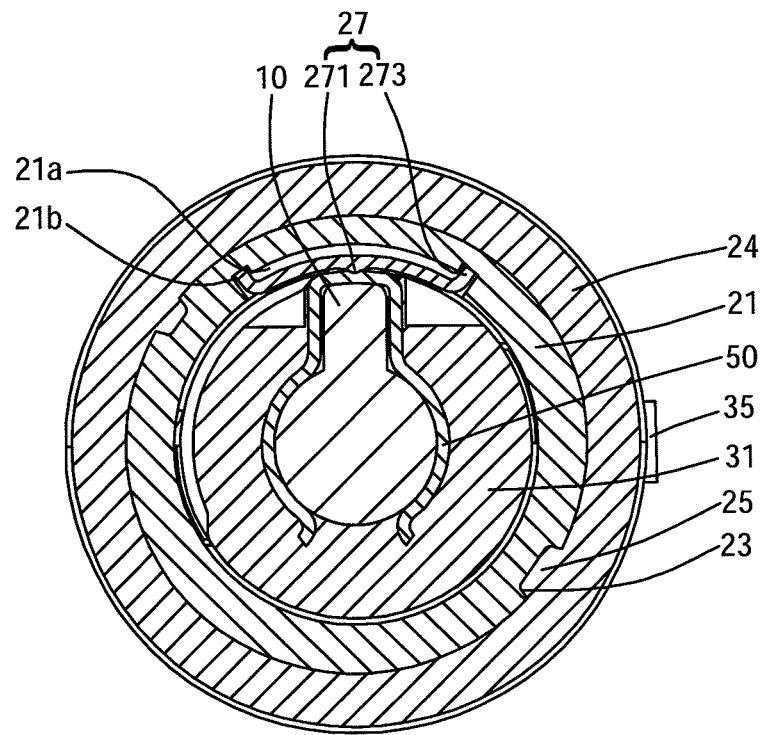
FIG. 7 is a transverse sectional view (II) of the earphone plug with a mode switching function according to the invention.

FIG. 7 is a transverse sectional view (II) of the earphone plug with a mode switching function according to the invention. Referring to FIG. 7, the bushing 24 is controlled to drive the movable sleeve 21 to rotate, such that the earphone plug 100 is switched from the first mode to the second mode, and the metal sheet 27 of the movable sleeve 21 contacts the first conductive member 50.

Figure 8:
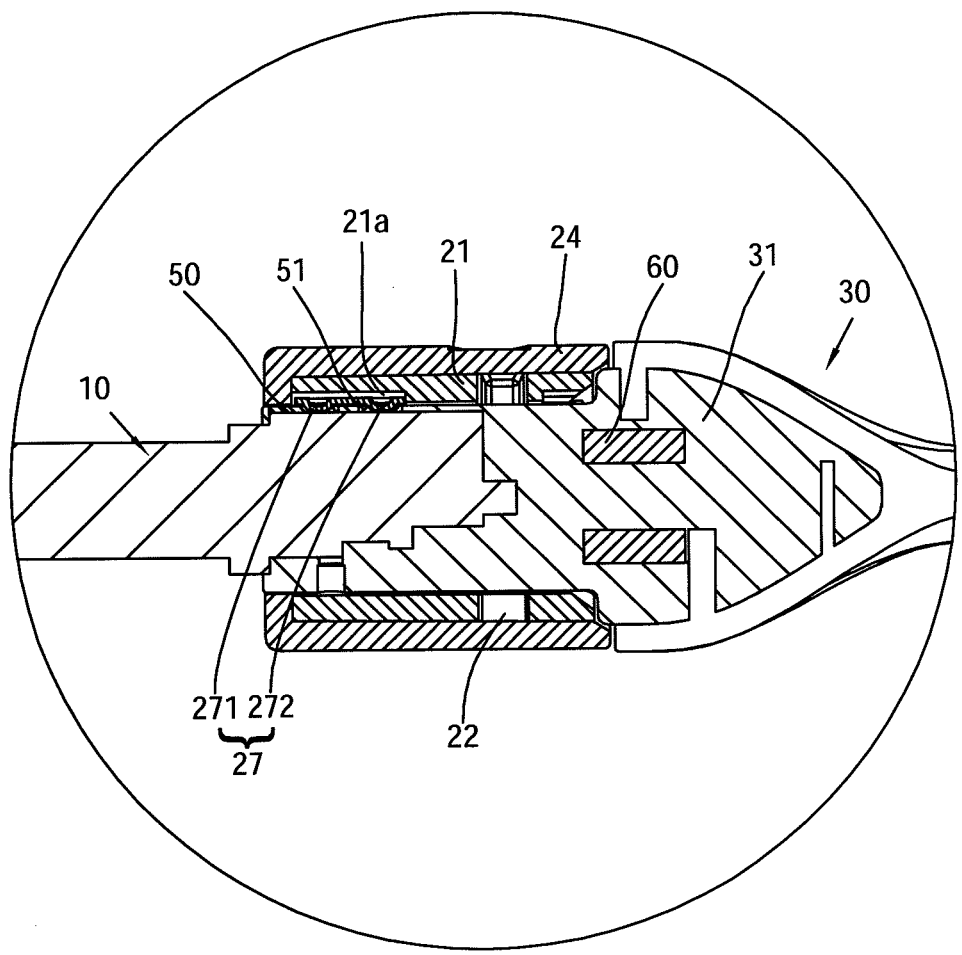
FIG. 8 is a partial axial sectional view (II) of the earphone plug with a mode switching function according to the invention.

FIG. 8 is an axial sectional view (II) of the earphone plug with a mode switching function according to the invention. Due to the displacement of the movable sleeve 21, the first contact 271 and second contact 272 of the metal sheet 27 contact the first conductive member 50 and the second conductive member 51 respectively, such that the first conductive member 50 and the second conductive member 51 are electrically connected. In this way, the corresponding electrodes are in communication, the microphone signal and the ground signal of the earphone plug 100 are switched into an independent ground signal, and the earphone plug 100 is correspondingly applicable to three-electrode earphone jacks, especially music players such as MP3s.

Although the switching device 20 in the invention switches the mode by rotation, the switching device 20 can also change the mode by other equivalent or similar means, for example, sliding operation, which also falls within the technical scope of the invention.

In the earphone plug with a mode switching function of the invention, a switching device with a metal sheet is used, during the rotation relative to a terminal, the metal sheet is pressed against the first conductive member and the second conductive member at the rear end of the terminal, and the first conductive member and the second conductive member are electrically connected, such that the earphone plug is switched from the original first four-electrode mode (with dual channel signals, a microphone signal, and a ground signal) to the second three-electrode mode (with dual channel signals and a ground signal). In this way, the earphone plug of the invention is applicable to music players with three-electrode jacks and mobile phones with four-electrode jacks, and thus is an earphone plug with a dual-mode switching function, so as to provide ease of use for earphone products and meet the requirements of consumers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An earphone plug with a mode switching function, comprising:
   a terminal, having a plurality of electrodes for transmitting signals; and
   a switching device, combined with the terminal and capable of switching between a first mode and a second mode, wherein when the switching device switches to one of the two modes, two of the electrodes of the terminal are electrically connected together, so as to achieve mode switching to perform processing on different transmission signals,
   wherein the electrodes comprise a first electrode, a second electrode, a third electrode, and a fourth electrode, for transmitting a left channel signal, a right channel signal, a microphone signal, and a ground signal respectively,
   wherein an insulating portion of the terminal is clamped by a first conductive member and a second conductive member connected to the third electrode and the fourth electrode respectively,
   wherein the switching device comprises a metal sheet for being pressed against the first conductive member and the second conductive member during mode switching, such that the first conductive member and the second conductive member are electrically connected.

2. The earphone plug with a mode switching function according to claim 1, wherein the metal sheet is revised U-shaped, and has a first contact and a second contact for being pressed against the first conductive member and the second conductive member respectively.

3. The earphone plug with a mode switching function according to claim 1, wherein the switching device comprises a movable sleeve, the metal sheet is disposed inside the movable sleeve, a plastic member is embedded at the rear end of the terminal, and the movable sleeve is rotatably sleeved on the plastic member.

4. The earphone plug with a mode switching function according to claim 3, wherein a combination groove is disposed on an inner periphery of the movable sleeve, for accommodating the metal sheet, a positioning portion is recessed on two sides of the combination groove, and the metal sheet is provided with two foot portions for combination with the positioning portion.

5. The earphone plug with a mode switching function according to claim 3, wherein the plastic member comprises a first perforation and a second perforation, for allowing the first conductive member and the second conductive member to protrude from a surface of the plastic member.

6. The earphone plug with a mode switching function according to claim 3, wherein the movable sleeve has a pair of guide grooves disposed transversally thereon, and the plastic member comprises a pair of stopping blocks corresponding to the guide grooves, so as to limit a displacement of the movable sleeve relative to the plastic member.

7. The earphone plug with a mode switching function according to claim 3, further comprising a bushing sleeved on the movable sleeve, the movable sleeve has a pair of fastening grooves disposed in an axial direction on an outer periphery thereof, and the bushing has a corresponding pair of fastening blocks disposed thereon, such that the bushing drives the movable sleeve to rotate.

8. The earphone plug with a mode switching function according to claim 7, wherein the plastic member is assembled on a fixed sleeve for allowing a wire to extend through, and the fixed sleeve has a marking point disposed thereon corresponding to an indication area disposed on an outer periphery of the bushing.

* * * * *